US009645534B2

(12) United States Patent
Tokunaga

(10) Patent No.: US 9,645,534 B2
(45) Date of Patent: May 9, 2017

(54) CONTACTLESS TYPE TEMPERATURE DETECTING DEVICE CONFIGURED TO DETECT A TEMPERATURE OF A HEATED BODY WITHOUT CONTACTING, AND FIXING DEVICE AND IMAGE FORMING APPARATUS INCLUDING THE TEMPERATURE DEVICE

(71) Applicant: KYOCERA Document Solutions Inc., Osaka (JP)

(72) Inventor: Ryohei Tokunaga, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/144,053

(22) Filed: May 2, 2016

(65) Prior Publication Data

US 2016/0334740 A1    Nov. 17, 2016

(30) Foreign Application Priority Data

May 15, 2015 (JP) ................................. 2015-100197

(51) Int. Cl.
*G03G 15/20* (2006.01)
*G01K 1/16* (2006.01)
*G01J 5/12* (2006.01)

(52) U.S. Cl.
CPC ............ *G03G 15/2039* (2013.01); *G01J 5/12* (2013.01); *G01K 1/16* (2013.01); *G03G 15/2017* (2013.01)

(58) Field of Classification Search
CPC ........................ G03G 15/2039; G03G 15/2017
USPC ............................................. 399/69, 92, 122
See application file for complete search history.

(56) References Cited

U.S. PATENT DOCUMENTS

| 5,819,136 | A * | 10/1998 | Tomita et al. ..... G03G 15/2039 399/69 |
| 7,522,861 | B2 * | 4/2009 | Yano ...................... G03G 21/20 399/122 |
| 8,737,878 | B2 * | 5/2014 | Yamaguchi et al. .................. G03G 15/2039 399/122 |

FOREIGN PATENT DOCUMENTS

| JP | 2003-029571 A | 1/2003 |
| JP | 2005-241544 A | 9/2005 |
| JP | 2006-300701 A | 11/2006 |

* cited by examiner

*Primary Examiner* — William J Royer
(74) *Attorney, Agent, or Firm* — Studebaker & Brackett PC

(57) ABSTRACT

A contactless type temperature detecting device includes a temperature detecting sensor, a separating plate, an airflow path forming member, an air blower and an air hole. The temperature detecting sensor has a temperature detecting surface facing a heated body. The separating plate is configured to separate a first space on a side of the temperature detecting surface of the temperature detecting sensor from a second space on an opposite side of the temperature detecting surface. The airflow path forming member is provided on a surface of the separating plate on either one side of the first space or the second space. The air blower is configured to simultaneously form air flow in the first space and the second space. The air hole is provided along an outer circumference of the temperature detecting sensor and configured to communicate the first space with the second space.

10 Claims, 3 Drawing Sheets

CONTACTLESS TYPE TEMPERATURE DETECTING DEVICE CONFIGURED TO DETECT A TEMPERATURE OF A HEATED BODY WITHOUT CONTACTING, AND FIXING DEVICE AND IMAGE FORMING APPARATUS INCLUDING THE TEMPERATURE DEVICE

INCORPORATION BY REFERENCE

This application is based on and claims the benefit of priority from Japanese Patent application No. 2015-100197 filed on May 15, 2015, the entire contents of which are incorporated herein by reference.

BACKGROUND

The present disclosure relates to a temperature detecting device configured to detect a temperature of a heated body without contacting, and a fixing device and an image forming apparatus including the temperature detecting device.

In an image forming apparatus, a toner image transferred onto a sheet is heated and pressurized between a heating member and a pressurizing member in a fixing device to be fixed onto the sheet. A temperature of the heating member is controlled based on a temperature detected by a temperature detecting device.

A temperature detecting type of the temperature detecting device typically includes a contact type and a contactless type. As a temperature detecting sensor of the contact type temperature detecting device, for example, a thermistor is used. Since the thermistor is used by being mounted on a surface of the heating member, the surface of the heating member is sometimes damaged by the thermistor. Once the surface of the heating member is damaged, image failure occurs, and thus the damaged heating member must be wasted. In this case, the thermistor as well as the heating member are wasted, and thus problems in cost and resource saving may occur. In addition, there is also a problem that the contact type thermistor is insufficient in precise temperature control because of its slow response speed.

As a temperature detecting sensor of the contactless type temperature detecting device, for example, a thermopile has been known. The thermopile measures a temperature by detecting infrared rays radiated from the heated body, and has a sufficient response speed. In addition, there is an advantage that the thermopile is not required to be positioned in the vicinity of the heating member and can be therefore positioned on a side of an apparatus main body of the image forming apparatus.

However, in such a contactless type temperature detecting device, if an obstacle exists between a temperature detecting surface of the temperature detecting sensor and the heated body, the infrared rays radiated from the heated body are blocked. This has an influence on the detected temperature. In addition, there is also a problem that an output value of the thermopile varies dependent on an atmosphere temperature because of its low heat resistance.

In order to prevent invasion of the obstacle between the temperature detecting surface and the heated body, there is a fixing device including a contactless type temperature detecting device provided with a cover covering the temperature detecting sensor. In the fixing device, by making a positive pressure in the inside of the cover by using an air blowing fan, an adhesion of foreign matters on the temperature detecting surface of the temperature detecting sensor is prevented. In addition, there is a fixing device provided with a pulsatile pump making a pressure in the vicinity of the temperature detecting surface of a temperature sensor higher than an atmosphere pressure. Further, there is a fixing device provided with a guide member configured to guide an air flow formed by an air blowing fan to the temperature detecting surface from the back side of a temperature sensor.

However, in the fixing device provided with the air blowing fan, since the air flow generated by the air blowing fan flows toward a fixing member, the fixing member may be partially cooled, causing non-uniform temperature distribution of the fixing member. In addition, the fixing device provided with the pulsatile pump has problems that the configuration of the fixing device is complicated and cost is increased.

SUMMARY

In accordance with an embodiment of the present disclosure, a contactless type temperature detecting device is configured to detect a temperature of a heated body without contacting. The contactless type temperature detecting device includes a temperature detecting sensor, a separating plate, an airflow path forming member, an air blower and an air hole. The temperature detecting sensor has a temperature detecting surface facing the heated body. The separating plate is configured to separate a first space on a side of the temperature detecting surface of the temperature detecting sensor from a second space on an opposite side of the temperature detecting surface. The airflow path forming member is provided on a surface of the separating plate on either one side of the first space or the second space. The air blower is configured to simultaneously form air flow in the first space and the second space. The air hole is provided along an outer circumference of the temperature detecting sensor and configured to communicate the first space with the second space. The airflow path forming member is configured so that a length of the air flow formed in the first space is longer than that of the air flow formed in the second space.

In accordance with an embodiment of the present disclosure, a fixing device includes a heat roller, a pressurizing roller and the above-mentioned temperature detecting device. The heat roller is configured to be heated. The pressurizing roller is configured to form a fixing nip between the heat roller and the pressurizing roller. The temperature detecting device is configured to detect a temperature of the heat roller. The pressurizing roller is configured to form a fixing nip between the heat roller and the pressing roller. The temperature detecting device is configured to detect a temperature of the heat roller.

In accordance with an embodiment of the present disclosure, an image forming apparatus includes the above-mentioned fixing device.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, a temperature detecting device, a fixing device and an image forming apparatus according to an embodiment of the present disclosure will be described.

Figure 1:
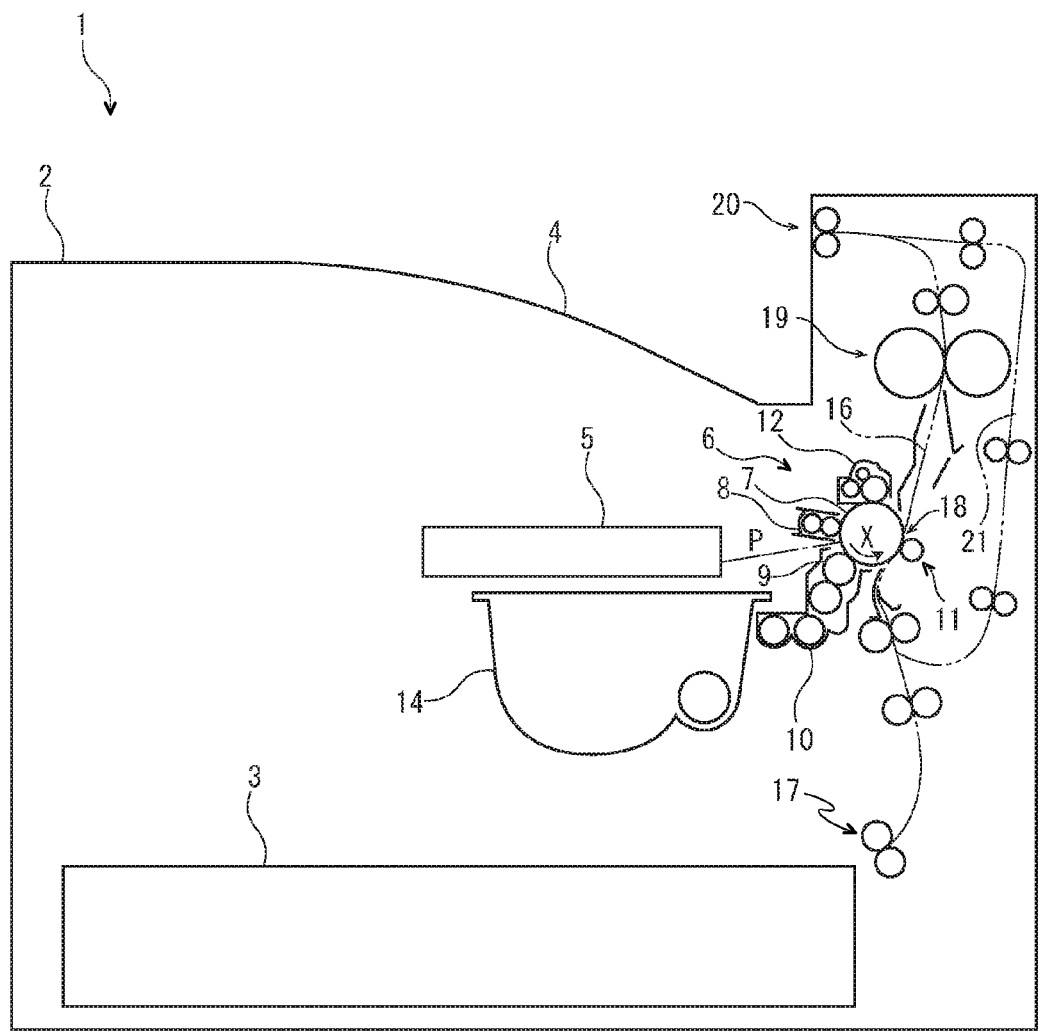
FIG. 1 is a schematic diagram showing an outline of a printer according to one embodiment of the present disclosure.

First, with reference to FIG. 1, an entire structure of a printer 1 (an image forming apparatus) will be described. FIG. 1 is a schematic diagram showing an outline of the printer 1 according to one embodiment of the present disclosure. In the following description, a front side of the sheet plane of FIG. 1 shows a front side of the printer 1 and left and right directions are based on a direction viewed from the front side of the printer 1.

The printer 1 includes a rectangular parallelepiped printer main body 2. In a lower part of the printer main body 2, a sheet feeding cartridge 3 configured to store sheets is installed and, on a top surface of the printer main body 2, an ejected sheet tray 4 is formed.

In a center part of the printer main body 2, an exposure device 5 composed of a laser scanning unit (LSU) is installed. On a right side of the exposure device 5, an image forming unit 6 is installed. In the image forming unit 6, a photosensitive drum 7 (an image carrier) is rotatably installed. Around the photosensitive drum 7, a charger 8, a development device 10 having a developing roller 9, a transfer roller 11 and a cleaning device 12 are arranged along a rotating direction (refer to arrow X in FIG. 1) of the photosensitive drum 7. The development device 10 is connected to a toner container 14 configured to store toner (developer).

Along a right side part of the printer main body 2, a sheet conveying path 16 traveling from the sheet feeding cartridge 3 to the ejected sheet tray 4 is formed. In the sheet conveying path 16, in order from an upstream side, a sheet feeder 17, a transferring part 18 formed between the photosensitive drum 7 and the transfer roller 11, a fixing device 19 and a sheet ejecting part 20 are provided. On a right side of the sheet conveying path 16, an inversion path 21 for duplex printing is formed.

Next, the operation of forming an image by the printer 1 having such a configuration will be described. First, a surface of the photosensitive drum 7 is electrically charged by the charger 8. Then, exposure corresponding to an image data on the photosensitive drum 7 is carried out by a laser (refer to one-dot chain line P in FIG. 1) from the exposure device 5, thereby forming an electrostatic latent image on the surface of the photosensitive drum 7. Subsequently, the electrostatic latent image is developed to a toner image with the toner supplied from the toner container 14 in the development device 10.

On the other hand, a sheet fed from the sheet feeding cartridge 3 by the sheet feeder 17 is conveyed to the image forming unit 6 along the sheet conveying path 16 in a suitable timing for the above-mentioned image forming operation, and then, the toner image on the photosensitive drum 7 is transferred onto the sheet in the transferring part 18. The sheet with the transferred toner image is conveyed to a downstream side on the sheet conveying path 16 to go forward to the fixing device 19, and then, the toner image is fixed on the sheet in the fixing device 19. The sheet with the fixed toner image is ejected from the sheet ejecting part 20 to the ejected sheet tray 4. The toner remained on the photosensitive drum 7 is collected by the cleaning device 12.

Figure 2:
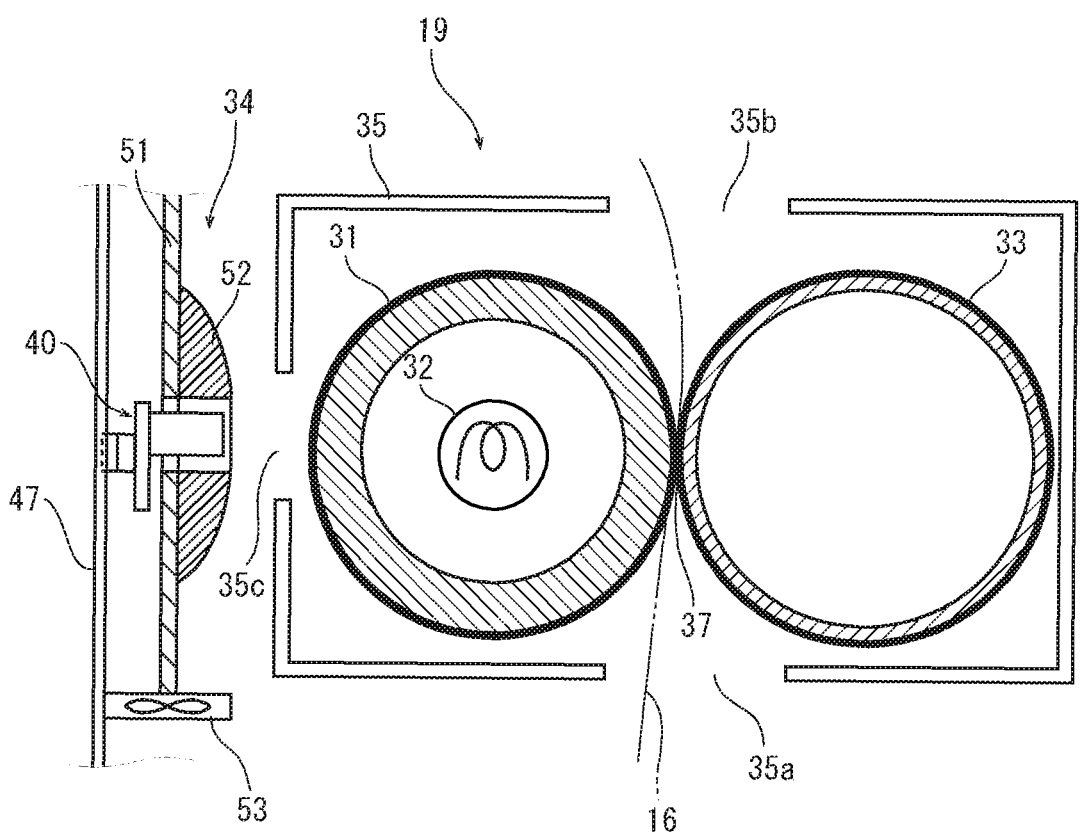
FIG. 2 is a front view schematically showing a fixing device according to one embodiment of the present disclosure.
Figure 3:
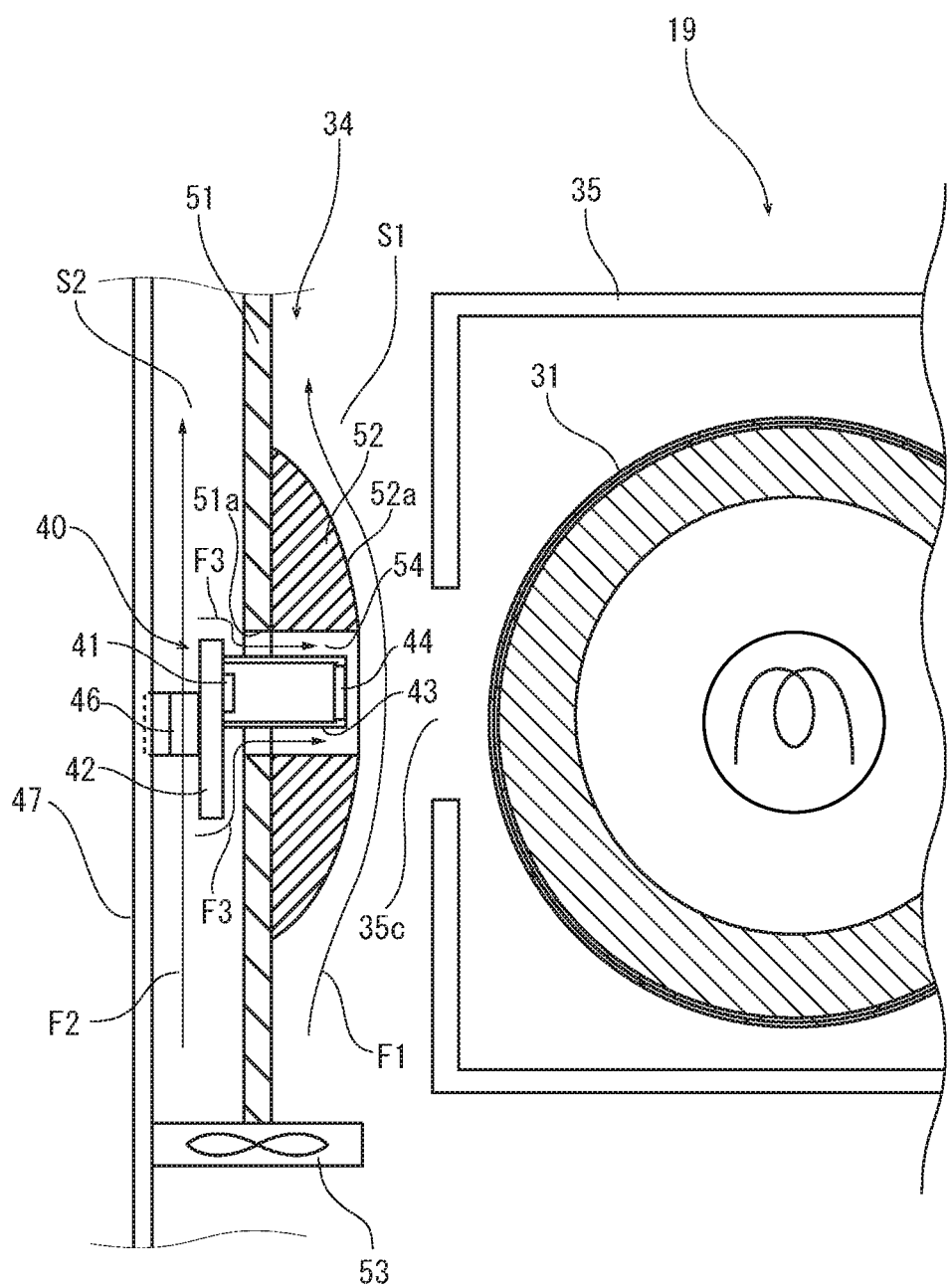
FIG. 3 is a front view schematically showing a temperature detecting device according to one embodiment of the present disclosure.

Next, the fixing device 19 will be described with reference to FIG. 2 and FIG. 3. FIG. 2 is a front view schematically showing the fixing device 19 and FIG. 3 is a front view schematically showing a temperature detecting device 34.

The fixing device 19 includes a heat roller (heated body) 31, a halogen heater 32 configured to heat the heat roller 31, a pressurizing roller (pressurizing member) 33 configured to come into pressure contact with the heat roller 31 and a temperature detecting device 34 configured to detect a temperature of a surface of the heat roller 31. The heat roller 31 and the pressurizing roller 33 are stored in a fixing housing 35.

The heat roller 31 has a cylindrical core metal and a release layer provided on an outer circumference surface of the core metal through an adhesive layer, and is supported to the fixing housing 35 rotatably. The halogen heater 32 is arranged in a hollow part of the heat roller 31 and radiates radiation heat to an inner circumference surface of the heat roller 31. The pressurizing roller 33 has a columnar core metal, an elastic layer provided on an outer circumference surface of the core metal and a release layer provided on an outer circumference surface of the elastic layer through an adhesive layer. The pressurizing roller 33 is supported to the fixing housing 35 rotatably. The pressurizing roller 33 comes into contact with the heat roller 31 to form a fixing nip 37 between the heat roller 31 and the pressurizing roller 33.

The fixing housing 35 is formed with an inlet side opening 35a through which the sheet is introduced into the fixing nip 37 and an outlet side opening 35b from which the sheet is discharged from the fixing nip 37. The inlet side opening 35a and the outlet side opening 35b are arranged along the sheet conveying path 16. The fixing housing 35 is further formed with a temperature detecting opening 35c. The temperature detecting opening 35c faces a roughly center of the outer circumference surface of the heat roller 31 in an axis direction of the heat roller 31.

The temperature detecting device 34 has a temperature detecting sensor 40 provided so as to face the temperature detecting opening 35c, a separating plate 51 provided so as to cross the temperature detecting sensor 40, an airflow path forming member 52 protruded on a surface of the separating plate 51 on a side of the temperature detecting opening 35c and an air blowing fan 53 (air blower) provided in a lower end of the separating plate 51.

The temperature detecting sensor 40, as shown in FIG. 3, has a temperature detecting element 41 capable of detecting infrared rays radiated from the surface of the heat roller 31. As such the temperature detecting element 41, for example, a thermopile can be used. The temperature detecting element 41 is mounted on a substrate 42 and is surrounded by a cylindrical cap 43 made of a metal. On a tip surface of the cap 43 (a surface facing the heat roller 31), an infrared rays transmission window 44 (a temperature detecting surface) is formed. The temperature detecting element 41 is configured to receive the infrared rays through the infrared rays transmission window 44.

The temperature detecting sensor 40 is supported to a frame 47 of the printer main body 2 by engaging a hook 46 formed on a back surface of the substrate 42 with an engaging part (not shown) formed on the frame 47. In this manner, the infrared rays transmission window 44 faces the heat roller 31 via the temperature detecting opening 35c of the fixing housing 35.

The separating plate 51 is provided between the temperature detecting opening 35c and the frame 47 to separate a first space S1 on a side of the infrared rays transmission window 44 of the temperature detecting sensor 40 from a second space S2 on a side opposite to the infrared rays transmission window 44. The separating plate 51 is formed with a through hole 51a through which the temperature detecting sensor 40 is inserted. The through hole 51a has a larger diameter than that of the cap 43 of the temperature detecting sensor 40.

The airflow path forming member 52 is a semi-columnar member having a convexly curved cross section viewed from the front side, and is formed on a surface of the separating plate 51 protruding into the first space S1 side. The formation of the protruded airflow path forming member 52 allows the separating plate 51 to have a cross sectional shape similar to that of a wing with an outer circumference face 52a convexly curved toward the fixing device 19.

Through the airflow path forming member 52, an air hole 54 having a diameter equal to the diameter of the through hole 51a of the separating plate 51 penetrates in a direction orthogonal to the separating plate 51. The air hole 54 passes through a top portion of the airflow path forming member 52.

The cap 43 of the temperature detecting sensor 40 is inserted into the air hole 54 from the through hole 51a of the separating plate 51. Between the substrate 42 of the temperature detecting sensor 40 and the separating plate 51, a gap is generated. It is to be noted that the infrared rays transmission window 44 of the temperature detecting sensor 40 is positioned on an inner side from the top portion of the airflow path forming member 52.

The air blowing fan 53 is provided so as to simultaneously form air flows each having a same volume of air into the first space S1 and the second space S2, respectively. Here, an air flow F2 formed in the second space S2 flows linearly along the surface of the separating plate 51. Meanwhile, an air flow F1 formed in the first space S1 flows while curving along the outer circumference face 52a of the airflow path forming member 52. Therefore, a length of the air flow F1 formed in the first space S1 is longer than that of the air flow F2 formed in the second space S2.

In the fixing device 19 described above, the temperature of the heat roller 31 is detected by the temperature detecting device 34. Specifically, the infrared rays radiated from the heat roller 31 and then passed through the temperature detecting opening 35c of the fixing housing 35 is detected by the temperature detecting element 41 through the infrared rays transmission window 44 of the temperature detecting sensor 40. Here, when the air blowing fan 53 is operated, as described above, the air flows F1 and F2 each having a same volume of air are simultaneously formed in the first space S1 and the second space S2 on the both sides separating plate 51, respectively.

As described above, the length of the air flow F1 formed in the first space S1 is longer than that of the air flow F2 formed in the second space S2. Therefore, a rate of the air flow F1 formed in the first space S1 is higher than that of the air flow F2 formed in the second space S2. Accordingly, in accordance with Bernoulli's theorem, the first space S1 has a negative pressure while the second space S2 has a positive pressure. When an air pressure difference is generated on both sides of the separating plate 51 as described above, an air flow F3 traveling from the second space S2 through the air hole 54 to the first space S1 is generated.

As described above, in the fixing device 19 of the present disclosure, the air flow F1 formed in the first space S1 flows along the infrared rays transmission window 44 of the cap 43 so that the retention of the foreign matter between the infrared rays transmission window 44 and the temperature detecting opening 35c of the fixing housing 35 can be prevented. In addition, since the infrared rays transmission window 44 is positioned on the inner side from the top portion of the airflow path forming member 52, foreign matters are prevented from being adhered to the infrared rays transmission window 44 so that misdetection of the temperature can be prevented. Further, by also the air flow F3 generated in the air hole 54, invasion of the foreign matters into a space in front of the infrared rays transmission window 44 can be prevented. It is to be noted that, the direction of the air flow F3 generated in the air hole 54 is orthogonally to the direction of the air flow F1 formed in the first space S1. Therefore, the air flow F3 generated in the air hole 54 is hard to reach the heat roller 31, and no air flow that cools the heat roller 31 is generated.

Further, since the air flow F3 generated in the air hole 54 cools the cap 43, an increase in the temperature of the substrate 42 of the temperature detecting sensor 40 can be prevented. Therefore, it becomes possible to accurately control the temperature of the heat roller 31 by the temperature detecting device 34.

In addition, using of one air blowing fan 53 allows prevention of the invasion of foreign matters between the infrared rays transmission window 44 and the heat roller 31 and also cooling of the temperature detecting element 41 and the substrate 42. Therefore, increase of the number of parts and complicating of a mechanism are not caused.

In addition, in the present embodiment, since the airflow path forming member 52 is formed so as to have the convexly curved cross section along the direction of the air flow, the air flow F1 in the first space S1 is made to be smooth. Further, since the air hole 54 is formed so as to penetrate through the top portion of the airflow path forming member 52, the length of the air hole 54 is made longer. This can improve cooling effect of the cap 43. However, the air hole 54 is not necessary to penetrate through the top portion of the airflow path forming member 52.

It is to be noted that the airflow path forming member 52 can be also provided on a surface of the separating plate 51 on a side of the second space S2. In this case, an air flow traveling from the first space S1 on a side of the fixing device 19 to the second space S2 on an opposite side of the fixing device 19 is generated in the air hole 54. That is, a higher temperature air in a space in which the heat roller 31 as a heated body is provided flows into the air hole 54, and thus a satisfactory cooling effect cannot be obtained. Therefore, it is preferred that the airflow path forming member 52 is provided so that a lower temperature air flows into the air hole 54, in other words, the airflow path forming member 52 is provided on a surface facing a higher temperature air space, like the present embodiment, in a viewpoint of obtaining a cooling effect of the temperature detecting sensor 40.

Further, in the present embodiment, a case where the configuration of the present disclosure is applied to the printer 1 has been described. Meanwhile, in the other different embodiments, the configuration of the disclosure may be applied to another image forming apparatus, such as a copying machine, a facsimile or a multifunction peripheral.

Further, in the description of the embodiment of the present disclosure as described above, suitable embodiments in the temperature detecting device, the fixing device and the image forming apparatus according to the present disclosure has been described. Therefore, the description may add technically preferred various limitations, but the technical scope of the present disclosure is not limited to these embodiments unless there is description particularly limiting the present disclosure. In other words, components in the embodiment of the present disclosure described above can be appropriately exchanged with existing components, and various variations including combinations with other existing components are possible. The description of the embodiment of the present disclosure described above does not limit the content of the disclosure described in claims.

What is claimed is:

1. A contactless type temperature detecting device configured to detect a temperature of a heated body without contacting, the contactless type temperature detecting device comprising:
   a temperature detecting sensor having a temperature detecting surface facing the heated body;
   a separating plate configured to separate a first space on a side of the temperature detecting surface of the temperature detecting sensor from a second space on an opposite side of the temperature detecting surface;
   an airflow path forming member provided on a surface of the separating plate on either one side of the first space or the second space;
   an air blower configured to simultaneously form air flow in the first space and the second space; and
   an air hole provided along an outer circumference of the temperature detecting sensor and configured to communicate the first space with the second space,
   wherein the airflow path forming member is configured so that a length of the air flow formed in the first space is longer than that of the air flow formed in the second space.

2. The temperature detecting device according to claim 1, wherein the airflow path forming member is configured so that a rate of the air flow formed in the first space is higher than that of the air flow formed in the second space.

3. The temperature detecting device according to claim 1, wherein the airflow path forming member protrudes from the surface of the separating plate into the first space.

4. The temperature detecting device according to claim 1, wherein the air blower includes one air blowing fan which forms air flows each having a same volume of air in the first space and the second space.

5. The temperature detecting device according to claim 1, wherein the airflow path forming member has a convexly curved shaped cross section and
   the air hole is configured so as to penetrate a top portion of the airflow path forming member.

6. The temperature detecting device according to claim 5, wherein the temperature detecting surface of the temperature detecting sensor is positioned on an inner side from the top portion of the airflow path forming member.

7. The temperature detecting device according to claim 1, wherein the air hole is configured to extend in a direction orthogonal to a direction of the air flow formed by the air blower.

8. The temperature detecting device according to claim 1, wherein the temperature detecting sensor is a thermopile.

9. A fixing device comprising:
   a heat roller configured to be heated;
   a pressurizing roller configured to form a fixing nip between the heat roller and the pressurizing roller; and
   the temperature detecting device according to claim 1 configured to detect a temperature of the heat roller.

10. An image forming apparatus comprising the fixing device according to claim 9.

* * * * *